US012742391B2

(12) United States Patent
Craig et al.

(10) Patent No.: US 12,742,391 B2
(45) **Date of Patent: *Sep. 22, 2026**

(54) METHOD OF RESTORING ALLOY DEPLETION IN AN AIRFOIL AROUND COOLING HOLES

(71) Applicant: RTX Corporation, Farmington, CT (US)

(72) Inventors: Brian Richard Craig, Tequesta, FL (US); Michael J. Minor, Mansfield, TX (US); Randall D. Kelton, Ft. Worth, TX (US); Arka Ray, Arlington, TX (US); Xuan Liu, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/030,953

(22) Filed: Jan. 17, 2025

(65) Prior Publication Data

US 2025/0163808 A1 May 22, 2025

Related U.S. Application Data

(63) Continuation of application No. 18/468,404, filed on Sep. 15, 2023, now Pat. No. 12,203,384.

(51) Int. Cl.
*F01D 5/00* (2006.01)
*B23P 6/04* (2006.01)
(Continued)

(52) U.S. Cl.
CPC .............. *F01D 5/005* (2013.01); *B23P 6/045* (2013.01); *F01D 5/186* (2013.01); *F01D 5/288* (2013.01);
(Continued)

(58) Field of Classification Search
CPC ...... F01D 5/008; B23P 6/045; B23P 2700/06; F05D 2230/10; F05D 2230/90; F05D 2230/40
See application file for complete search history.

(56) References Cited

U.S. PATENT DOCUMENTS 4,953,777 A 9/1990 Griffith et al.
5,967,755 A 10/1999 Czech et al.
(Continued)

FOREIGN PATENT DOCUMENTS

CN 116892421 A 10/2023
EP 4332269 A1 3/2024

OTHER PUBLICATIONS

Search Report issued in European Patent Application No. 24200601.3; Date of Mailing Jan. 29, 2025 (8 pages).
(Continued)

*Primary Examiner* — Eldon T Brockman
(74) *Attorney, Agent, or Firm* — CANTOR COLBURN LLP

(57) ABSTRACT

A method of reducing depletion of elements from an airfoil includes disposing a bond coating on the airfoil, where the airfoil comprises cooling channels. The airfoil includes a material that has an initial composition. A cooling hole is machined in the airfoil to contact the cooling channels such that a fluid travelling in the cooling channel may be discharged via the cooling hole. The machining of the cooling hole results in a formation of a depleted region around the cooling hole. The depleted region is depleted of a portion of the initial composition of the airfoil. A top coat is disposed on the bond coat. The airfoil is subjected to a heat treatment at a temperature effective to promote diffusion of elements from a non-depleted region to the depleted region around the cooling hole.

20 Claims, 7 Drawing Sheets

(51) Int. Cl.

| | |
|---|---|
| ***F01D 5/18*** | (2006.01) |
| ***F01D 5/28*** | (2006.01) |
| ***F01D 9/06*** | (2006.01) |

(52) U.S. Cl.

CPC .......... *F01D 9/065* (2013.01); *B23P 2700/06* (2013.01); *F05D 2230/10* (2013.01); *F05D 2230/90* (2013.01); *F05D 2260/202* (2013.01)

(56) References Cited

U.S. PATENT DOCUMENTS

| | | | | |
|---|---|---|---|---|
| 6,042,879 | A * | 3/2000 | Draghi | C23C 4/02 29/889.1 |
| 6,042,880 | A | 3/2000 | Rigney et al. | |
| 6,171,711 | B1 | 1/2001 | Draghi et al. | |
| 7,138,065 | B2 * | 11/2006 | Czech | C23G 5/00 216/87 |
| 7,628,890 | B2 | 12/2009 | Chupka et al. | |
| 2005/0058547 | A1 | 3/2005 | Bruce et al. | |
| 2005/0106316 | A1 | 5/2005 | Rigney et al. | |
| 2012/0084981 | A1 | 4/2012 | Arikawa et al. | |
| 2012/0156054 | A1 * | 6/2012 | Lacy | C23C 28/3455 164/76.1 |
| 2018/0297156 | A1 * | 10/2018 | Nagaraj | C23C 14/5806 |
| 2023/0313691 | A1 | 10/2023 | Lewis et al. | |
| 2024/0133040 | A1 | 4/2024 | Nagaraj et al. | |

OTHER PUBLICATIONS

Search Report issued in European Patent Application No. 26152335.1; Date of Mailing Jul. 2, 2026 (9 pages).

* cited by examiner

METHOD OF RESTORING ALLOY DEPLETION IN AN AIRFOIL AROUND COOLING HOLES

CROSS-REFERENCE TO RELATED APPLICATIONS

This application is a Continuation of U.S. application Ser. No. 18/468,404 filed Sep. 15, 2023, the disclosure of which is incorporated herein by reference in its entirety.

BACKGROUND

This disclosure relates to restoring alloy depletion in an airfoil around a cooling hole. In particular, this disclosure relates to restoring metal elements from turbine vanes in the region surrounding cooling holes.

Turbine airfoils are formed of blades and vanes. They are used in gas turbine engines and steam turbines to extract energy from the high-temperature, high-pressure gas produced by the combustor. Turbine airfoils are often manufactured from superalloys to withstand the harsh environment.

Cooling holes are small openings in the turbine airfoils that allow cool air from the compressor to be discharged over the airfoil surface, forming a low-temperature film that protects the airfoils from the hot gas. Cooling holes are essential to avoid turbine failure and ensure the engines safe operation. Cooling holes are usually created by laser or electrical discharging machining methods.

Alloy depletion in cooling holes of turbine airfoils is a phenomenon that occurs when the metal elements in the alloy are removed during airfoil manufacturing during the process of machining the cooling holes. The consequence of alloy depletion is lower oxidation and corrosion resistance on the surface. It is therefore desirable to rebalance alloy composition in the region proximate to the cooling hole in an airfoil.

SUMMARY

In an embodiment, a method of reducing depletion of elements from an airfoil includes disposing a bond coating on the airfoil, where the airfoil comprises a concave pressure wall, a convex suction wall and cooling channels. The concave pressure wall extends radially from a base to a tip of the airfoil and the convex suction wall contacts the concave pressure wall at a leading edge and at a trailing edge spaced axially from leading edge. The airfoil includes a material that has an initial composition. A cooling hole is machined in the airfoil to contact the cooling channels such that a fluid travelling in the cooling channel may be discharged via the cooling hole. The machining of the cooling hole results in a formation of a depleted region around the cooling hole. The depleted region is depleted of a portion of the initial composition of the airfoil. A top coat is disposed on the bond coat. The airfoil is subjected to a heat treatment at a temperature effective to promote diffusion of elements from a non-depleted region to the depleted region around the cooling hole. The non-depleted region is located further away from the cooling hole than the depleted region.

In an embodiment, the depleted region contacts a surface of the cooling hole or cooling hole diffuser.

In an embodiment, the initial composition comprises a nickel-based superalloy or a cobalt-based superalloy and where the depleted region contains a smaller amount of at least one element than that contained in the initial composition.

In another embodiment, the initial composition comprises a nickel-based superalloy or a cobalt-based superalloy and where the depleted region contains a smaller amount of at least two elements than that contained in the initial composition.

In yet another embodiment, the heat treatment is conducted at a temperature of 1900 to 2350° F. for a time period of 0.5 hours to 50 hours.

In yet another embodiment, the heat treatment is conducted at a temperature of 2000 to 2300° F.

In yet another embodiment, the heat treatment is conducted at a temperature of 2100 to 2250° F. for 1 to 10 hours.

In yet another embodiment, the at least one element is either aluminum or chromium.

In yet another embodiment, the at least two elements are aluminum and chromium.

In yet another embodiment, a composition of the airfoil after heat treatment is different from that of the initial composition.

In yet another embodiment, the machining of the cooling hole is conducted prior to the disposing of the top coat on the airfoil.

In yet another embodiment, the machining of the cooling hole is conducted after the disposing of the top coat on the airfoil.

In yet another embodiment, the depleted region has a smaller amount of at least one element than that contained in the non-depleted region.

In yet another embodiment, the depleted region has a smaller amount of at least two elements than that contained in the non-depleted region.

In yet another embodiment, the heat treatment results in mitigation of an oxide formation rate in the cooling hole as compared with an oxide formation in the absence of the heat treatment.

In yet another embodiment, the top coat is a thermal barrier coating.

In yet another embodiment, the thermal barrier coating comprises yttria stabilized zirconia.

DETAILED DESCRIPTION

Figure 1:
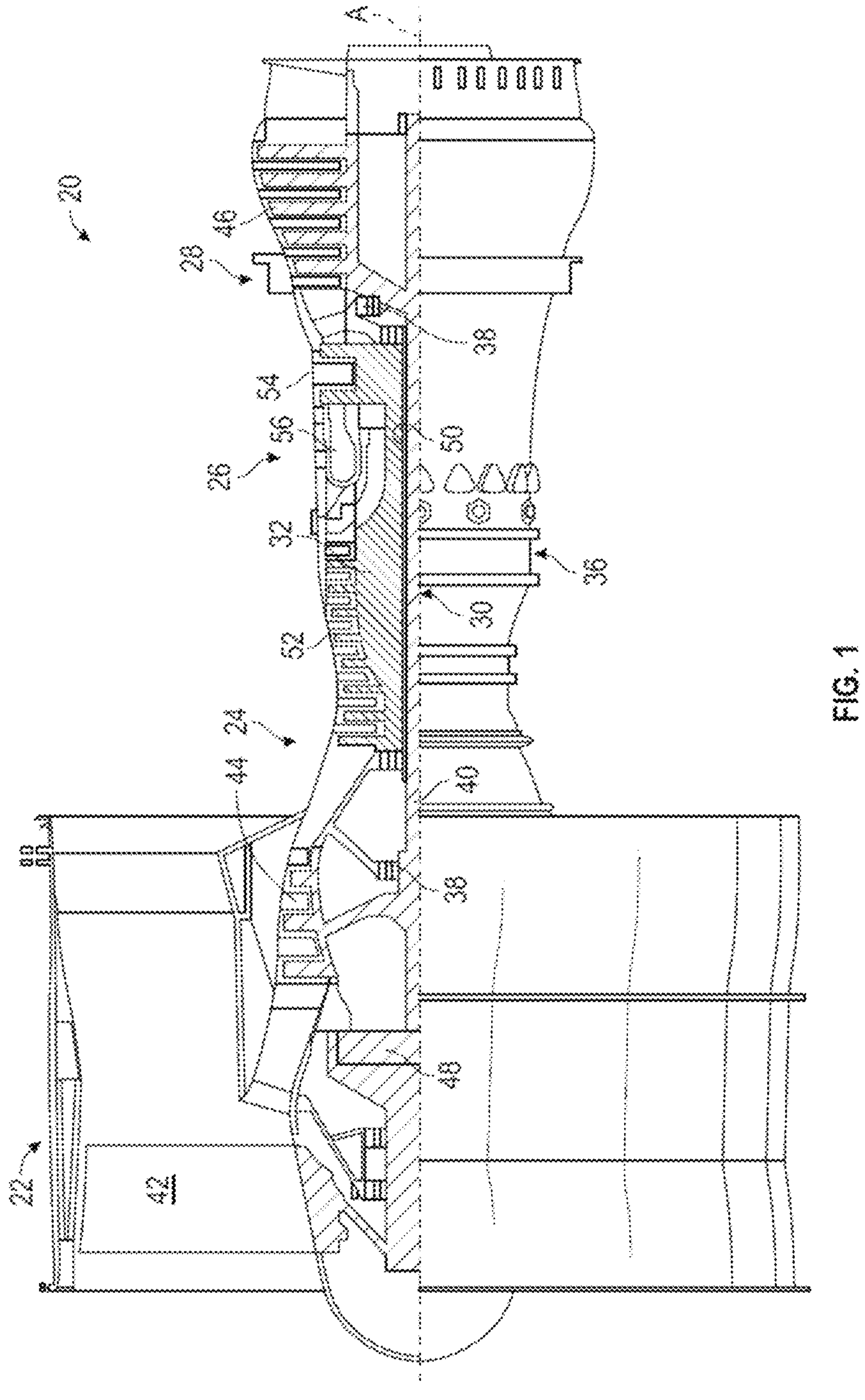
FIG. 1 is a schematic, partial cross-sectional view of a turbomachine in accordance with this disclosure.

Disclosed herein is method of rebalancing metal alloy composition in the region around cooling holes in a turbine airfoil (hereinafter "airfoil"). Turbine airfoils encompass turbine vanes or blade outer air seals/shrouds (BOAS). As noted above, alloys that are used to manufacture airfoils are often depleted (of some metal elements) during the formation of cooling holes in the airfoil. The depletion of these elements may result in shortening the life of the airfoil and hence of the turbine. The depletion of these elements is compensated for by conducting a homogenization step on the airfoil at an elevated temperature for a period of time sufficient to replenish the depleted region with the depleted elements that are drawn from non-depleted regions of the airfoil. The treatment at the elevated temperature permits diffusion of the elements from an non-depleted region to a region that has lost these elements during the process of machining a cooling hole.

Airfoils may comprise a nickel-based superalloy that comprises chromium and aluminum amongst other elements. These alloys have high strength, corrosion resistance, and creep resistance at high temperatures. Nickel-based superalloys used in airfoils include elements selected from nickel, chromium, aluminum, tantalum, hafnium, silicon, and yttrium. In other embodiments, in addition to the previously mentioned elements, the nickel-based superalloy may include one or more elements selected from carbon, boron, and zirconium. In yet another embodiment, the nickel-based superalloy further may include tungsten. In still another embodiment, the nickel-based superalloy may include incidental impurities (e.g., trace amounts of additional elements that are not intentionally included in the composition) but does not include other elements other than those listed previously. Examples of nickel-based superalloys used in the airfoil are but not limited to IN792, C101, MarM247, Rene80, Rene125, ReneN5, SC180, CMSX 4, and PWA1484.

Cobalt-based superalloys may also be used in the turbine airfoils and may be subjected to a homogenization process detailed below.

In an embodiment, the nickel-based superalloy contains more than 50 percent of nickel by weight and permits solidification of the whole airfoil as a single crystal. The use of single-crystal superalloys provides additional strength to the metal, making it able to withstand the high temperatures and stresses in the turbine. The nickel-based superalloy may be directionally solidified alloys or equiaxed materials, L turbine parts, vanes and BOAS.

Processes used to machine cooling holes include electro-discharge machining, laser drilling, laser ablation, or a combination thereof. Transient melting caused during these machining processes causes certain metals such as aluminum and chromium present in the alloy to evaporate when melting occurs. This results in a depletion of these metals from the alloy at the surface of the cooling hole especially when compared with the initial metal content in the alloy (prior to the machining of the hole) or when compared with the metal content in the alloy at a distance away from the cooling hole. It is desirable to have aluminum and chromium in the requisite quantities in the alloy because they are used to provide oxidation resistance in the single crystal alloys used in airfoils.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1.

Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
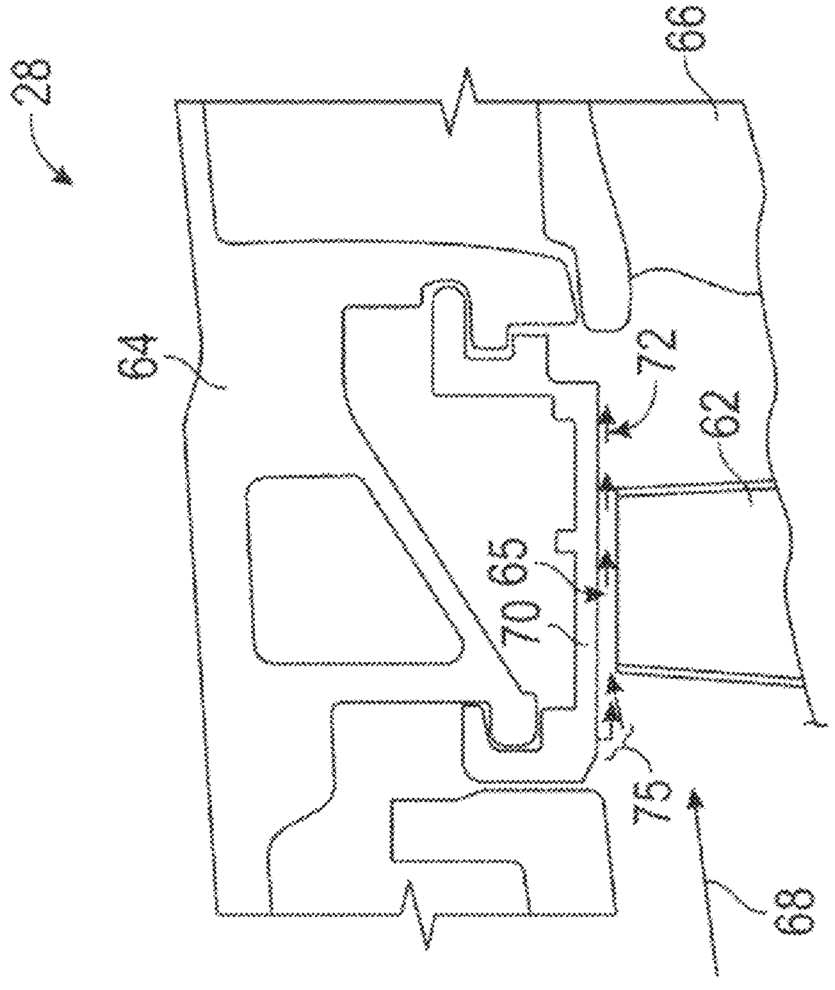
FIG. 2 is a schematic view of a portion of a turbine section of a gas turbine engine.

Referring to FIGS. 1 and 2, the example turbine section 28 includes at least one rotor having a turbine blade 62. The turbine blade 62 includes a tip 65 disposed adjacent to a blade outer air seal 70 (BOAS). A stationary vane 66 is mounted and supported within the case 64 on at least one side of the turbine blade 62 for directing gas flow into the next turbine stage. The stationary vane 66 also contains cooling holes (not shown). The BOAS 70 is disposed adjacent to the tip 65 to provide a desired clearance between the tip 65 and a gas path surface 72 of the BOAS 70. The clearance provides for increase efficiency with regard to the extraction of energy from the high energy gas flow indicated by arrow 68.

The turbine blade 62 and vane 66 along with the blade outer air seal are exposed to the high-energy exhaust gas flow 68. The high energy exhaust gas flow 68 is at an elevated temperature and thereby structures such as the blade 62, vane 66 and the BOAS 70 are fabricated from materials capable of withstanding the extremes in temperature. Moreover, each of these structures may include provisions for generating a cooling film air flow 75 over the surfaces. The cooling film air flow generates a boundary layer that aids in survivability for the various structures within the path of the exhaust gasses 68.

In the disclosed example, a plurality of BOAS 70 are supported within the case 64 and abut each other to form a circumferential boundary radially outward of the tip 65. Accordingly, at least one stage of the turbine section 28 includes a plurality of BOAS 70 that define a radial clearance between the tip 65 and the gas path surface 72. Additional stages in the turbine section 28 will include additional BOAS to define the radial clearance with turbine blades of each stage.

Figure 3:
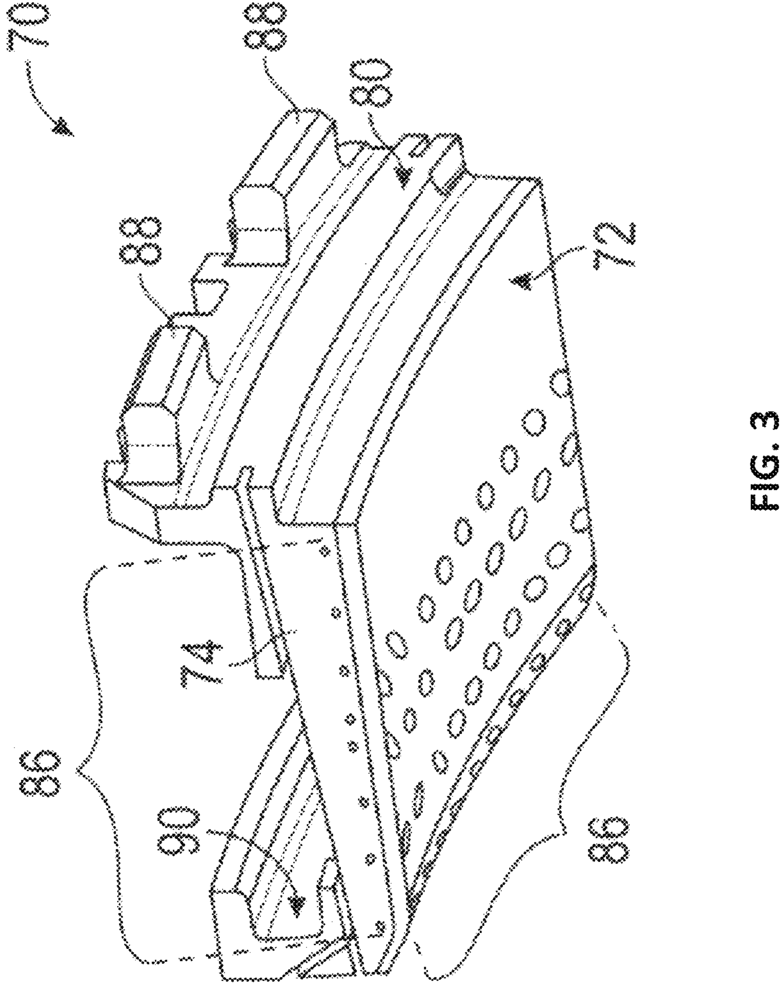
FIG. 3 is a perspective view of an example blade outer air seal.

Referring to FIG. 3 with continued reference to FIG. 2, the BOAS 70 includes a plurality of film cooling holes 86 for generating a film cooling air flow, indicated at 75 in FIG. 2, along the gas path surface 72. The film cooling holes 86 are disposed on surfaces exposed to the exhaust gasses 68. It should be understood that the term "holes" is used by way of description and not intended to limit the shape to a round opening. Accordingly, the example holes 86 maybe round, oval, square or any other shape desired.

Figure 6:
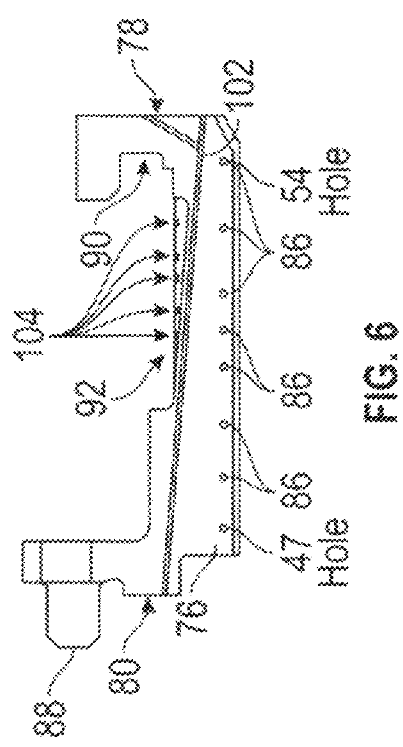
FIG. 6 is a second side view of an example blade outer air seal.

BOAS 70 includes the gas path surface 72 that is exposed directly to the exhaust gasses 68. The BOAS 70 further includes a first side 74 and a second side 76 (See FIG. 6). The first and second sides 74, 76 abut adjacent BOASs disposed circumferentially about the turbine case 64. Each of the BOASs 70 includes a forward surface 78 and an aft surface 80. The forward surface 78 and aft surface 80 includes support features for holding each BOAS within the turbine case 64. In this example, the BOAS 70 includes a forward channel 90 and an aft tab 88 to conform to features within the turbine cases 64 to support the BOAS 70 circumferentially about the corresponding turbine blade 62.

The first side 74 and second side 76 and a gas path surface 72 all include a plurality of film cooling holes 86. Each of the film cooling holes 86 provide a pathway for cooling air to generate the boundary layer of cooling air flow 75 to maintain the BOAS within defined temperature ranges. A specific location of the film cooling holes 86 is devised to provide cooling air flow coverage of features susceptible to the high temperature exhaust gasses. The cooling holes 86 are arranged to produce boundary layers of cooling flow along the gas path surface 72 along with the first side 74 and the second side 76. As appreciated, the first side and second side provide the cooling air holes 86 to inject cooling flow between adjacent blade outer air seals 70.

Figure 4:
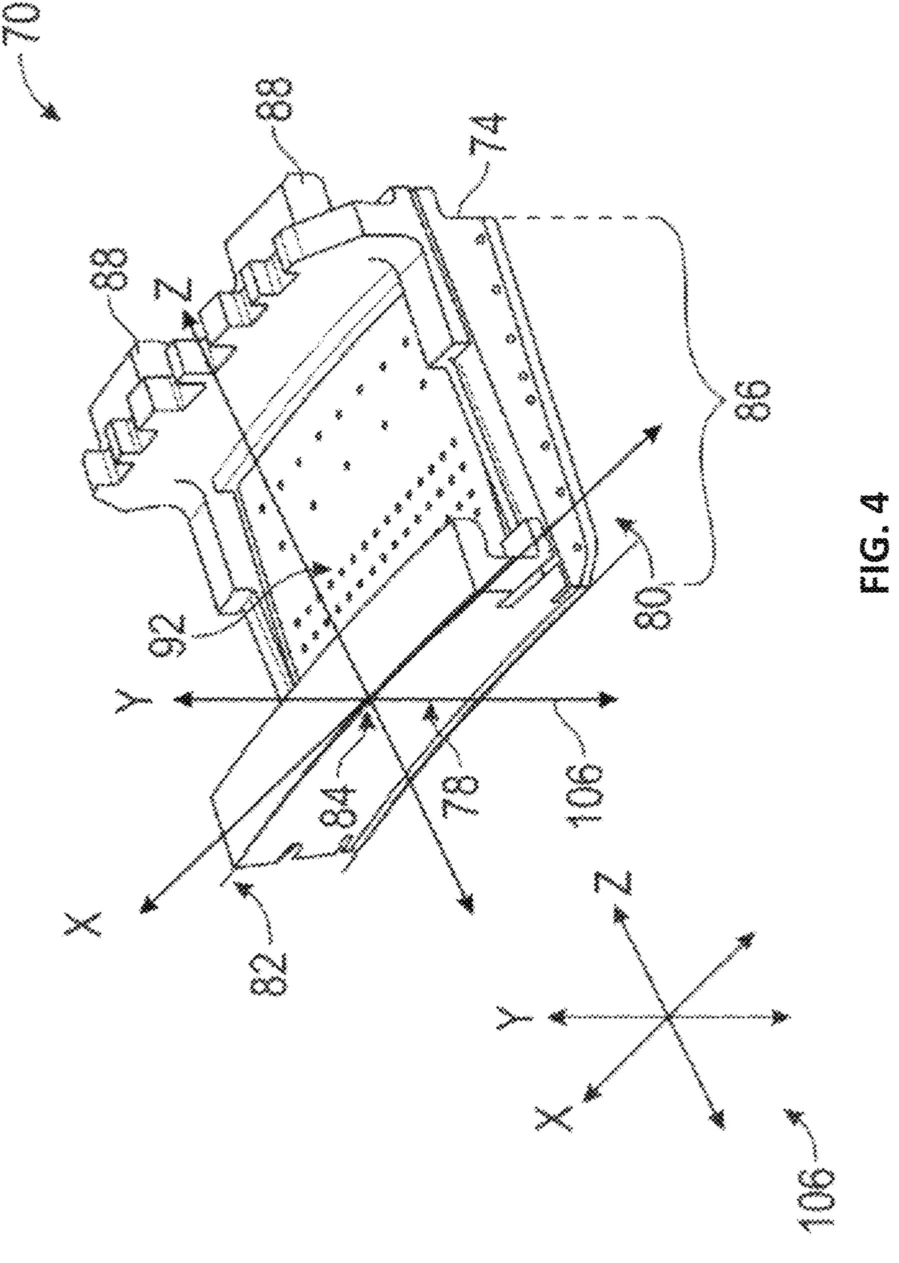
FIG. 4 is a another perspective view of the example blade outer air seal.
Figure 5:
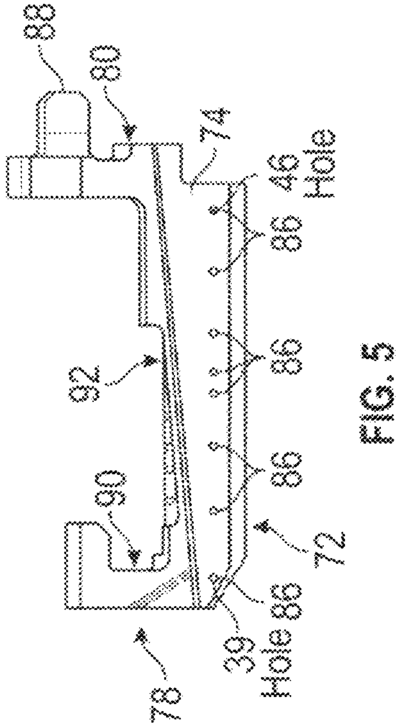
FIG. 5 is a first side view of an example blade outer air seal.

The location of the cooling holes 86 are described in terms of Cartesian coordinates indicated by the axes 106 that includes X, Y and Z axes which correspond to the radial direction (Y), the circumferential direction (X), and the axial direction (Z) as is shown in FIG. 4 relative to a point of origin indicated at 84. The locations for the cooling holes 86 correspond to the location where the holes break through the surface of either the first side 74, the second 76 or the gas path surface 72.

Figure 7:
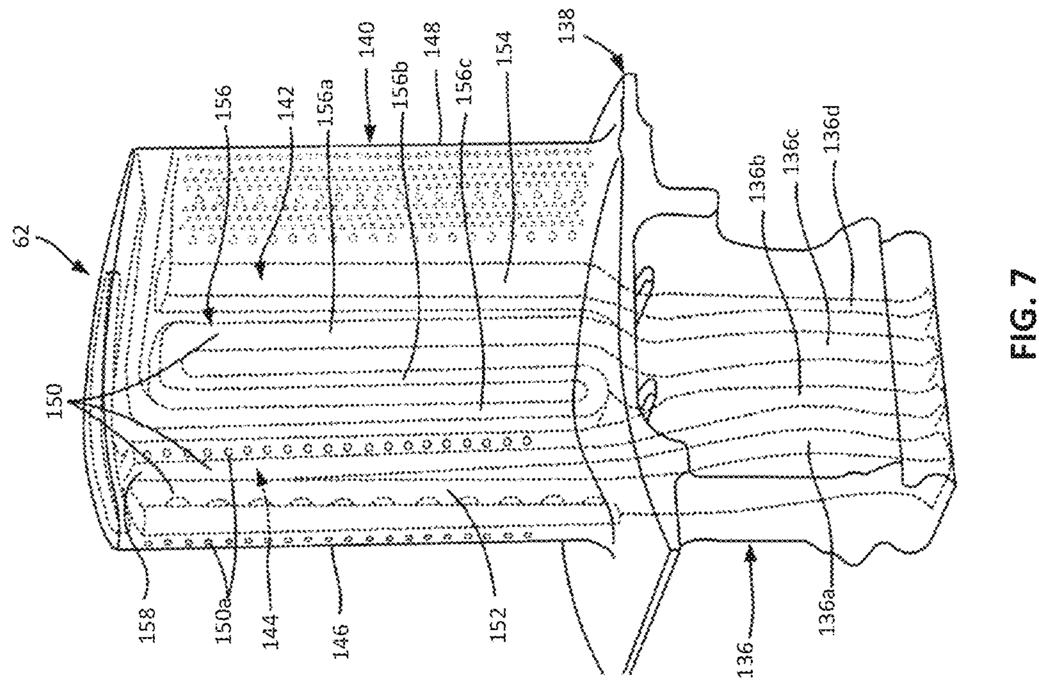
FIG. 7 is a depiction of an exemplary airfoil.

FIG. 7 is a perspective view of cooled turbine blade 62, which includes root 136, platform 138, and airfoil 140. Blade 62 may be, for example, a high pressure turbine blade. Root 136 of blade 62 may include a dovetail or fir tree geometry configured to be received in a slot in the rim of a rotor disc. Root 136 includes four cooling fluid supply channels **136*a*, 136*b*, 136*c*, and 136*d*. Platform 138 is integral with and radially outward of root 136. Supply channels 136*a*, 136*b*, 136*c*, and 136*d* extend through platform 138 into airfoil 140. Airfoil 140 of blade 62 extends radially from platform 138 to the tip of blade 62. Airfoil 140 includes concave pressure wall 142, convex suction wall 144, and cooling channels 150. Concave pressure wall 142 extends radially from the base to the tip of airfoil 140. Convex suction wall 144 is connected to concave pressure wall 142 at leading edge 146 and trailing edge1 48 spaced axially from leading edge 146. Concave pressure wall 142 and convex suction wall 144 may include film cooling apertures, such as film cooling holes 150*a*, adapted to exhaust cooling fluid from cooling channels 150 onto the exterior surface of airfoil 140**.

Cooling channels 150 are formed between concave pressure wall 142 and convex suction wall 44 and configured to receive cooling fluid from supply channels **136*a*, 136*b*, 136*c*, and 136*d*. Cooling channels 150 include leading edge channel 152, trailing edge channel 154, serpentine cooling circuit 156, and dedicated up-pass channel 158. Leading edge channel 152 extends radially from the base toward the tip of airfoil 140 and is in flow communication with supply channel 136 *a*. Trailing edge channel 154 extends radially from the base toward the tip and is in flow communication with supply channel 136***d* and trailing edge apertures, such as holes and/or slots, adapted to exhaust cooling fluid to the exterior of airfoil 140. Serpentine circuit 156 includes first channel 156*a*, second channel 156*b*, and third channel 156*c*. First channel 156 *a* is forward of and adjacent to trailing edge channel 154 and extends radially from the base toward the tip of airfoil 140. First channel 156*a* is in flow communication with supply channel 136*c*. Second channel 156*b* is in flow communication with first channel 156*a* and extends radially adjacent the tip toward the base of airfoil 140. Third channel 156*c* is in flow communication with second channel 156*b* and extends radially from the base toward the tip of airfoil 140. Dedicated up-pass channel 158 extends radially from the base toward the tip of airfoil 140 between leading edge channel 152 and third channel 156*c* of serpentine circuit 156 and is in flow communication with supply channel 136*b*.

During engine operation, blade 62 may be cooled using, for example, air bled from compressor section 24 shown in FIG. 1. Compressor bleed air is fed to supply channels 136*a*, 136*b*, 136*c*, and 136*d* in root 136 of blade 62. Air flows radially outward through supply channel 36*a* into leading edge channel 152 inside airfoil 140. Air also flows radially outward through supply channel 136*d* into trailing edge channel 154 and may be exhausted to the exterior of airfoil 140 through trailing edge exhaust apertures, such as holes and/or slots. Air flows radially outward through supply channel 136*c* into first channel 156*a* of serpentine circuit 156. The air flow in serpentine circuit 156 continues from first channel 156*a* into second channel 156*b* and third channel 156*c*. Finally, the remaining portion of compressor bleed air flows radially outward through supply channel 136*b* into dedicated up-pass channel 158. Blade 62 is convectively cooled, as the relatively cool air fed from the compressor flows through cooling channels 150 in airfoil 140. Additionally, blade 62 may include film cooling holes in concave pressure wall 142 and convex suction wall 144 adapted to exhaust cooling fluid from one or more of cooling channels 150 to the exterior surfaces of airfoil 140, thereby creating a thin layer of cooling fluid that insulates airfoil 140 from the hot working medium gas flowing over blade 62.

As noted above, cooling holes 150*a* manufactured via machining processes that include electro-discharge machining, laser drilling, laser ablation, or a combination thereof result in metal depletion from the region that immediately surrounds the cooling hole 150*a*. In order to restore the metal content in the region immediately surrounding the cooling hole, the airfoil (in the form of a workpiece since it is not yet an airfoil) is subjected to a homogenization cycle in which the workpiece is heated to an elevated temperature for a time period that is sufficient to enable diffusion of the depleted metal elements into the depletion zone from regions surrounding the depletion zone.

Figures 8A, 8B:
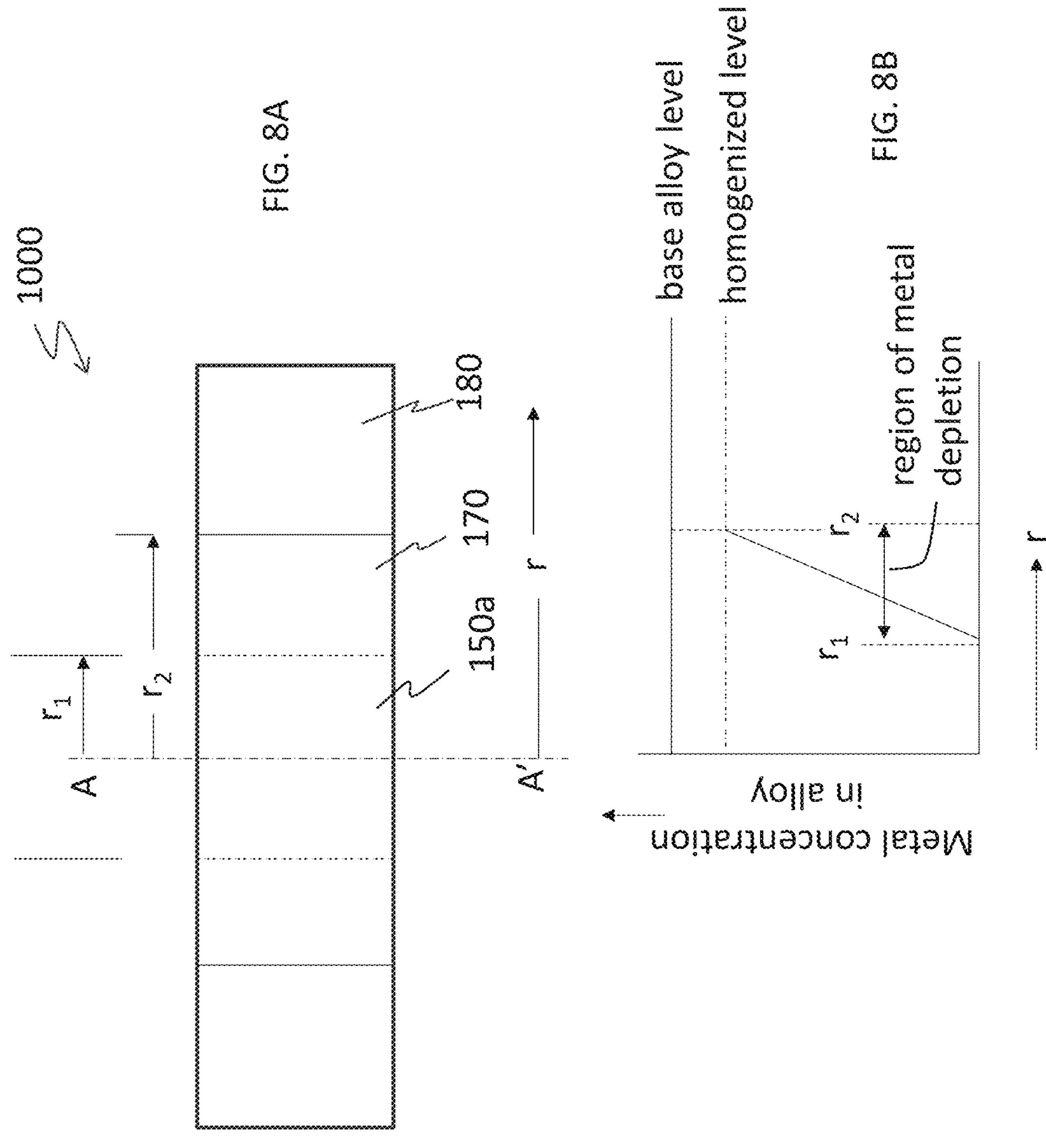
FIG. 8A is a depiction of a portion of an airfoil in the region around a cooling hole.
FIG. 8B is a graph that depicts the concentration of elements around a cooling hole in the initial composition and in the composition after homogenization.

FIG. 8A depicts a section of an exemplary airfoil 1000 with a cooling hole 150*a* (about axis AA') of radius $r_1$. FIG. 8A depicts the region of metal depletion 170 (of average radius $r_2$) that surrounds the cooling hole 150*a* as well as the region 180 that contains the base alloy (without any metal depletion) that surrounds the region of metal depletion 170. The distance from axis AA' (the center of the hole) is measured along arrow "r". FIG. 8B is a graph that measures metal concentration in the base alloy composition from the central axis AA' as "r" increases. The y-axis of the graph in FIG. 8B is aligned with the central axis AA' of the FIG. 8A. The metal used in the airfoil has an initial composition depicted by the solid line titled "base alloy composition".

The region 180 (see FIG. 8A) which lies outside the radius 12, has the base alloy composition. If no cooling hole was drilled in the alloy, the entire airfoil would have an initial composition that is represented by the solid line titled "base alloy composition".

As may be seen from the FIG. 8B, the base alloy composition is depleted of some metals (such as, for example, aluminum and chromium) during the drilling of the hole. At least a portion of the initial composition is lost during the drilling of the hole to form a depleted region that surrounds the cooling hole. In an embodiment, the depleted region contains a smaller amount of at least one element than that contained in the initial composition. In an embodiment, the depleted region contains a smaller amount of at least two elements than that contained in the initial composition.

This results in the formation of region 170 (see FIG. 8A) within an average radius $r_2$ of axis AA' in the immediate vicinity of the cooling hole that suffers from alloy depletion. When the workpiece is subjected to an elevated temperature, the workpiece undergoes a process of homogenization where metals in the region 180 that have not suffered depletion (non-depleted regions) diffuse into the region 170 that have suffered depletion. This results in a uniform concentration of the depleted metals in the entire region of the workpiece. This new region of uniform concentration is represented by the dotted line titled "homogenized level". It may be seen that the concentration of metals in the originally depleted region 170 is the same as that in the region 180 (farther from the cooling hole 150*a*) that was previously not affected by the drilling of the hole. The new concentration of the depleted metal is lower across the entire workpiece than the original concentration of the metal in the base alloy. Thus, while homogenization brings about a uniform distribution of metal concentration in the entire workpiece, it results in a slightly lower concentration of lost metals across the entire workpiece. The composition of the workpiece after homogenization is slightly different from that of the initial composition.

The conduction of the homogenization step subsequent to the manufacturing of the cooling hole restores the alloy composition in depleted region via diffusion from the non-depleted base alloy. Homogenization results in a desirable reduction of the formation of oxides of nickel and cobalt on a surface of the cooling hole. In other words, the depleted surfaces of the cooling holes achieve a base chemistry oxidation resistance (upon undergoing homogenization) and do not prematurely undergo oxidization in a manner that adversely impacts the life of the airfoil. The homogenization may also be conducted retroactively on airfoils that have undergone service in the field.

The process of homogenization may be conducted on a new workpiece (e.g., an airfoil) that is eventually machined into an airfoil as follows. First a metallic coat (also known as a bond coat) is applied to the workpiece (the airfoil). The cooling hole is then machined in the workpiece after which a top coat is applied to the workpiece. In an embodiment, the cooling hole may be machined after the bond coat and top coat are applied to the workpiece. The homogenization process is conducted after the cooling hole is machined and the top coat is applied to the workpiece. After the homogenization process, the workpiece is ready to be installed into a turbine as an airfoil.

A first method comprises apply a metallic coat (hereinafter "bond coat") to the workpiece that is to be formed into an airfoil. A bond coat is a type of coating that is applied to the surface of turbine airfoils to protect them from environmental degradation. The bond coat is the first layer of a thermal barrier coating (TBC), which is a ceramic coating with a very low thermal conductivity that reduces the alloy surface temperature by insulating it from the hot gas. The bond coat is usually made of diffusion aluminide or MCrAlY (M=Ni, Co, or NiCo).

The cooling hole may be machined via electrical discharge machining or laser machining. In an embodiment, the cooling hole may then be drilled via electrical discharge machining (EDM) (also known as spark machining, spark eroding, die sinking, wire burning or wire erosion), which is a metal fabrication process whereby a desired shape is obtained by using electrical discharges (sparks). Material is removed from the workpiece by a series of rapidly recurring current discharges between two electrodes separated by a dielectric liquid and subject to an electric voltage. One of the electrodes is called the tool-electrode, or simply the tool or electrode, while the other is called the workpiece-electrode, or workpiece. When the voltage between the two electrodes is increased, the intensity of the electric field in the volume between the electrodes becomes greater, causing dielectric break down of the liquid, and producing an electric arc. As a result, material is removed from the electrodes.

In another embodiment, laser machining is a non-contact process that uses heat directed from a laser beam to remove material from the workpiece. During the machining process to form the cooling holes, metal depletion occurs in the workpiece as detailed above. In an embodiment, the non-depleted region contains an initial composition of a nickel-based superalloy or a cobalt-based superalloy. The depleted region contains a smaller amount of at least one element than that contained in the initial composition. The non-depleted region lies further away from a center of the cooling hole than the depleted region. The depleted region contacts a surface of the cooling hole, whereas a non-depleted region does not contact a surface of the cooling hole.

Following the formation of the cooling holes, a ceramic top coat is applied to the workpiece. The ceramic top coat is a type of coating that is applied to the surface of turbine blades to protect them from the high temperature and corrosive gases in the engine. Ceramic top coats have higher melting points and lower thermal conductivity than metal, which means they can reduce the heat transfer to the underlying metal substrate and extend the life of the turbine blades. Ceramic top coats are usually made of zirconia ($ZrO_2$) or alumina ($Al_2O_3$) and are sprayed or plasma-deposited onto the turbine blades after they are coated with the bond coat. The bond coat provides adhesion and oxidation resistance for the ceramic top coat.

Thermal barrier coatings (TBCs) are ceramic top coatings that are applied to the turbine blades to reduce the temperature of the metal surface by 100-300° C., which improves the thermodynamic efficiency and reduces pollutant emissions. TBCs are usually made of yttria-stabilized zirconia (YSZ), which has low thermal conductivity and good thermal expansion match with the bond coat.

As noted above, the thermal barrier coating may be applied to the workpiece prior to or after the machining of the cooling holes.

The homogenization step includes heat treating the workpiece to a temperature of 1900 to 2350° F. preferably 2000 to 2300° F., and more preferably to 2100 to 2250° F. for a time period of 0.5 hours to 50 hours, preferably for 1 to 10 hours.

The heat treatment at the elevated temperature results in the redistribution of elements that are lost from the base alloy composition during the machining of the cooling holes. The heat treatment results in the depleted region having an almost similar composition to that of the non-depleted region. This readjustment results in the composition of the heat treated airfoil being slightly different from that of the initial composition of the airfoil prior to the machining of the cooling holes. In an embodiment, aluminum and chromium in metal form are redistributed from the non-depleted portions of the airfoil to those portions of the airfoil that are depleted. Other metals present in the base alloy prior to machining of the holes such as nickel, tantalum, hafnium, silicon and yttrium may also diffuse from the depleted to non-depleted regions of the airfoil.

The method disclosed herein is advantageous in that depleted regions and surfaces that surround cooling holes may achieve base chemistry oxidation resistance as a result of the homogenization process and do not undergo premature oxidation, which reduces part life. In an embodiment, the heat treatment results in mitigation of an oxide formation rate in the cooling hole as compared with an oxide formation in the absence of the heat treatment.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention is not limited to the particular embodiments disclosed as the best mode contemplated for carrying out this invention, but that the invention will include all embodiments falling within the scope of the appended claims.

What is claimed is:

1. A method of reducing depletion of elements from an airfoil comprising:

disposing a bond coating on the airfoil, where the airfoil comprises a concave pressure wall, a convex suction wall and cooling channels; where the concave pressure wall extends radially from a base to a tip of the airfoil and where the convex suction wall contacts the concave pressure wall at a leading edge and at a trailing edge spaced axially from leading edge; where the airfoil comprises a material that has an initial composition;

machining a cooling hole in the airfoil to contact the cooling channels such that a fluid travelling in the cooling channel may be discharged via the cooling hole; where the machining of the cooling hole results in a formation of a depleted region around the cooling hole; where the depleted region is depleted of a portion of the initial composition of the airfoil; and subjecting the airfoil to a heat treatment at a temperature effective to promote diffusion of elements from a non-depleted region to the depleted region around the cooling hole; where the non-depleted region is located further away from the cooling hole than the depleted region.

2. The method of claim 1, where the depleted region contacts a surface of the cooling hole or cooling hole diffuser.

3. The method of claim 2, where the initial composition comprises a nickel-based superalloy or a cobalt-based superalloy and where the depleted region contains a smaller amount of at least one element than that contained in the initial composition.

4. The method of claim 3, where the at least one element is either aluminum or chromium.

5. The method of claim 2, where the initial composition comprises a nickel-based superalloy or a cobalt-based superalloy and where the depleted region contains a smaller amount of at least two elements than that contained in the initial composition.

6. The method of claim 5, where the at least two elements are aluminum and chromium.

7. The method of claim 1, where the heat treatment is conducted at a temperature of 1900 to 2350° F. for a time period of 0.5 hours to 50 hours.

8. The method of claim 5, where the heat treatment is conducted at a temperature of 2000 to 2300° F.

9. The method of claim 5, where the heat treatment is conducted at a temperature of 2100 to 2250° F. for 1 to 10 hours.

10. The method of claim 1, where a composition of the airfoil after heat treatment is different from that of the initial composition.

11. The method of claim 1, where the depleted region has a smaller amount of at least one element than that contained in the non-depleted region.

12. The method of claim 1, where the depleted region has a smaller amount of at least two elements than that contained in the non-depleted region.

13. The method of claim 1, where the heat treatment results in mitigation of an oxide formation rate in the cooling hole as compared with an oxide formation in the absence of the heat treatment.

14. A fan blade, a turbine vane or a blade outer air seal manufactured by a method comprising:

disposing a bond coating on the fan blade, the turbine vane or the blade outer air seal; where the fan blade, the turbine vane or the blade outer air seal comprises a material that has an initial composition;

machining a cooling hole in the fan blade, the turbine vane or the blade outer air seal to contact cooling channels such that a fluid travelling in the cooling channel may be discharged via the cooling hole; where the machining of the cooling hole results in a formation of a depleted region around the cooling hole; where the depleted region is depleted of a portion of the initial composition of the fan blade, the turbine vane or the blade outer air seal; and subjecting the fan blade, the turbine vane or the blade outer air seal to a heat treatment at a temperature effective to promote diffusion of elements from a non-depleted region to the depleted region around the cooling hole; where the non-depleted region is located further away from the cooling hole than the depleted region.

15. The fan blade, the turbine vane or the blade outer air seal of claim 14, where the depleted region contacts a surface of the cooling hole or cooling hole diffuser.

16. The fan blade, the turbine vane or the blade outer air seal of claim 15, where the initial composition comprises a nickel-based superalloy or a cobalt-based superalloy and where the depleted region contains a smaller amount of at least one element than that contained in the initial composition.

17. A fan blade, a turbine vane or a blade outer air seal manufactured by a method comprising:

disposing a bond coating on the fan blade, the turbine vane or the blade outer air seal; where the fan blade, the turbine vane or the blade outer air seal comprises a material that has an initial composition;

machining a cooling hole in the fan blade, the turbine vane or the blade outer air seal to contact cooling channels such that a fluid travelling in the cooling channel may be discharged via the cooling hole; where the machining of the cooling hole results in a formation of a depleted region around the cooling hole; where the depleted region is depleted of a portion of the initial composition of the fan blade, the turbine vane or the blade outer air seal;

disposing a top coat on the bond coat; and subjecting the fan blade, the turbine vane or the blade outer air seal to a heat treatment at a temperature effective to promote diffusion of elements from a non-depleted region to the depleted region around the cooling hole; where the non-depleted region is located further away from the cooling hole than the depleted region.

18. The fan blade, the turbine vane or the blade outer air seal of claim 17, where the depleted region contacts a surface of the cooling hole or cooling hole diffuser.

19. The fan blade, the turbine vane or the blade outer air seal of claim 18, where the initial composition comprises a nickel-based superalloy or a cobalt-based superalloy and where the depleted region contains a smaller amount of at least one element than that contained in the initial composition.

20. The fan blade, the turbine vane or the blade outer air seal of claim 17, where the initial composition comprises a nickel-based superalloy or a cobalt-based superalloy and where the depleted region contains a smaller amount of at least two elements than that contained in the initial composition.

* * * * *